US011460109B2

(12) United States Patent
Makinae

(10) Patent No.: US 11,460,109 B2
(45) Date of Patent: Oct. 4, 2022

(54) GASKET

(71) Applicant: NOK CORPORATION, Tokyo (JP)

(72) Inventor: Daichi Makinae, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/044,543

(22) PCT Filed: Jun. 12, 2019

(86) PCT No.: PCT/JP2019/023284
§ 371 (c)(1),
(2) Date: Oct. 1, 2020

(87) PCT Pub. No.: WO2020/039706
PCT Pub. Date: Feb. 27, 2020

(65) Prior Publication Data
US 2021/0108726 A1    Apr. 15, 2021

(30) Foreign Application Priority Data

Aug. 21, 2018 (JP) .............................. JP2018-154973

(51) Int. Cl.
*F16J 15/12* (2006.01)
*F16J 15/08* (2006.01)

(52) U.S. Cl.
CPC .......... *F16J 15/125* (2013.01); *F16J 15/121* (2013.01); *F16J 15/127* (2013.01); *F16J 15/0818* (2013.01); *F16J 15/12* (2013.01)

(58) Field of Classification Search
CPC ........ F16J 15/022; F16J 15/0856; F16J 15/12; F16J 15/121; F16J 15/122; F16J 15/125; F16J 15/127
See application file for complete search history.

(56) References Cited

U.S. PATENT DOCUMENTS 4,795,174 A * 1/1989 Whitlow ................. F16L 49/04
277/654
4,836,562 A  6/1989 Yoshino
(Continued)

FOREIGN PATENT DOCUMENTS

CN   104500734   4/2015
CN   104541075   4/2015
(Continued)

OTHER PUBLICATIONS

International Preliminary Report on Patentability issued in International Patent Application No. PCT/JP2019/023284, dated Feb. 23, 2021, and English language translation thereof.
(Continued)

*Primary Examiner* — Nicholas L Foster
(74) *Attorney, Agent, or Firm* — Greenblum & Bernstein, P.L.C.

(57) ABSTRACT

A gasket has a plurality of gasket members including annular reinforcing rings formed around respective axes and annular elastic body parts that are formed around the respective axes and that are formed from elastic bodies attached to the respective reinforcing rings. Outer peripheral surfaces of the plurality of the reinforcing rings are close to each other, and the plurality of the elastic body parts are joined together.

3 Claims, 3 Drawing Sheets

(56) References Cited

U.S. PATENT DOCUMENTS

| | | | | |
|---|---|---|---|---|
| 5,145,190 | A * | 9/1992 | Boardman | F16J 15/104 |
| | | | | 277/596 |
| 5,944,360 | A | 8/1999 | Crapart | |
| 7,121,557 | B2 * | 10/2006 | Christie | F16J 15/025 |
| | | | | 277/606 |
| 7,806,413 | B2 * | 10/2010 | Hurlbert | F16J 15/0818 |
| | | | | 277/592 |
| 10,612,660 | B2 * | 4/2020 | Yanagi | F16J 15/3236 |
| 2003/0178787 | A1 * | 9/2003 | Christie | H02G 3/088 |
| | | | | 277/549 |
| 2003/0201610 | A1 | 10/2003 | Carey | |
| 2005/0053420 | A1 * | 3/2005 | Blaszynski | F16J 15/121 |
| | | | | 403/122 |
| 2009/0066035 | A1 * | 3/2009 | Hurlbert | F02F 11/00 |
| | | | | 277/592 |
| 2012/0104701 | A1 * | 5/2012 | Bertini | F16J 15/3252 |
| | | | | 277/573 |
| 2015/0210314 | A1 | 7/2015 | Hosen et al. | |
| 2017/0051784 | A1 | 2/2017 | Kanagawa | |
| 2017/0089465 | A1 | 3/2017 | Yanagi | |
| 2019/0032783 | A1 * | 1/2019 | Yanagi | F16J 15/3236 |
| 2020/0191273 | A1 * | 6/2020 | Yanagi | F16J 15/025 |
| 2021/0164570 | A1 * | 6/2021 | Amano | F16J 15/121 |
| 2021/0404556 | A1 * | 12/2021 | Hagiwara | F16J 15/127 |

FOREIGN PATENT DOCUMENTS

| | | | |
|---|---|---|---|
| CN | 205618663 | | 10/2016 |
| CN | 106133413 | | 11/2016 |
| CN | 106460914 | | 2/2017 |
| CN | 206234363 | | 6/2017 |
| CN | 207454761 | | 6/2018 |
| DE | 24 50 914 | | 10/1973 |
| DE | 20 2016 104 770 | | 1/2018 |
| EP | 0 306 766 | | 8/1988 |
| EP | 0 860 636 | | 8/1998 |
| GB | 1487556 | | 10/1974 |
| JP | H01-261564 A | | 10/1989 |
| JP | 2005-214369 A | | 8/2005 |
| JP | 2012-67790 A | | 4/2012 |
| JP | 2019094848 A | * | 6/2019 |
| WO | WO 2015/137491 A1 | | 9/2015 |
| WO | WO-2015137491 A1 | * | 9/2015 ............. F16J 15/125 |

OTHER PUBLICATIONS

ISR for PCT/JP2019/023284, dated Jul. 16, 2019 (w/ translation).
Written Opinion for PCT/JP2019/023284, dated Jul. 16, 2019.
China Office Action in CN Application No. 201980013939.2, dated Dec. 10, 2021.
Extended European Search Report issued in EP application No. 19852460.5, dated Apr. 26, 2022.

* cited by examiner

GASKET

CROSS REFERENCE TO RELATED APPLICATIONS

This is the U.S. National Stage of International Application No. PCT/JP2019/023284, filed Jun. 12, 2019, which claims the benefit of Japanese Patent Application No. 2018-154973 filed Aug. 21, 2018, the disclosures of which are hereby incorporated by reference in their entirety.

TECHNICAL FIELD

The present disclosure relates to a gasket.

BACKGROUND ART

Conventionally, gaskets into which an annular reinforcing ring formed around an axis and a gasket body are molded and integrated have been widely used. Such a gasket, for example, includes two seal beads that are formed on one end, an end on one side, and another end, an end on another side, respectively, of a gasket body and that extend annularly to an inner periphery side as the seal beads extend in opposite directions. The gasket is disposed between one member, a member of a sealed object on one side, and another member, a member of the sealed object on another side (for example, see Japanese Patent Application Publication No. HEI01-261564).

SUMMARY OF DISCLOSURE

Technical Problem

In recent years, owing to miniaturization, complication, and other such changes of components (one member, another member) of automobiles and other vehicles, the space between a plurality of flow paths in the component has been narrowed. This does not provide an installation space satisfactory for installation of the above-described conventional gasket one by one on each of the plurality of the flow paths in the component and thus poses a problem that the conventional gasket cannot be installed in the component. In this way, the conventional gasket has been required to have a structure that allows such installation even if the space between the plurality of the flow paths is narrow.

In view of the challenge described above, it is an object of the present disclosure to provide a gasket that can be installed in a component even if the space between a plurality of flow paths in the component is narrow.

Solution to Problem

A gasket according to the present disclosure, accomplished to attain the object described above, is characterized by including a plurality of gasket members each including an annular reinforcing ring formed around an axis and an annular elastic body part that is formed around the axis and that is formed from an elastic body attached to the reinforcing ring, in which outer peripheral surfaces of a plurality of the reinforcing rings are close to each other, and a plurality of the elastic body parts are joined together.

In the gasket according to one aspect of the present disclosure, each of the elastic body parts includes: one annular seal bead formed at one end portion that is an end portion on one side of each of the elastic body parts, the one seal bead extending to an inner periphery side as progress toward the one side in a direction of the axis; and another annular seal bead formed at another end portion that is an end portion on another side of each of the elastic body parts, the other seal bead extending to the inner periphery side as progress toward the other side in the direction of the axis, wherein the one seal bead is higher in stiffness than the other seal bead.

In the gasket according to one aspect of the present disclosure, each of the elastic body parts includes an annular outer peripheral bead formed at one end portion of each of the elastic body parts, the outer peripheral bead extending from an outer peripheral surface of each of the elastic body parts to an outer periphery side.

Effects of Disclosure

The gasket according to the present disclosure can be installed in a component even if the space between a plurality of flow paths in the component is narrow.

DESCRIPTION OF EMBODIMENT

Hereinafter, an embodiment of the present disclosure is described with reference to the drawings.

Figure 1:
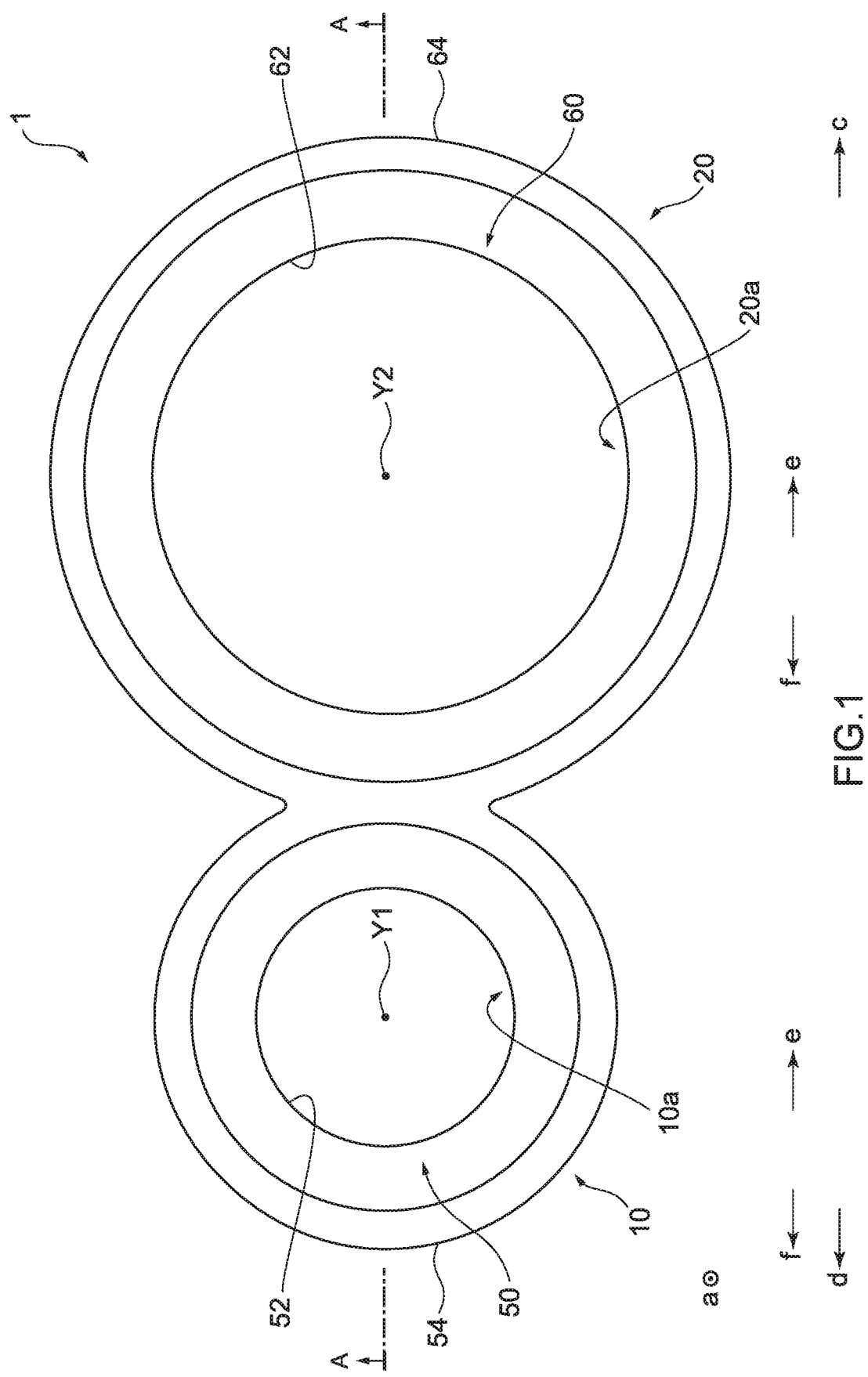
FIG. 1 A plan view illustrating a schematic configuration of a gasket according to an embodiment of the present disclosure FIG. 2 A cross-sectional view of a gasket according to an embodiment of the present disclosure, taken along line A-A in FIG. 1
Figure 2:
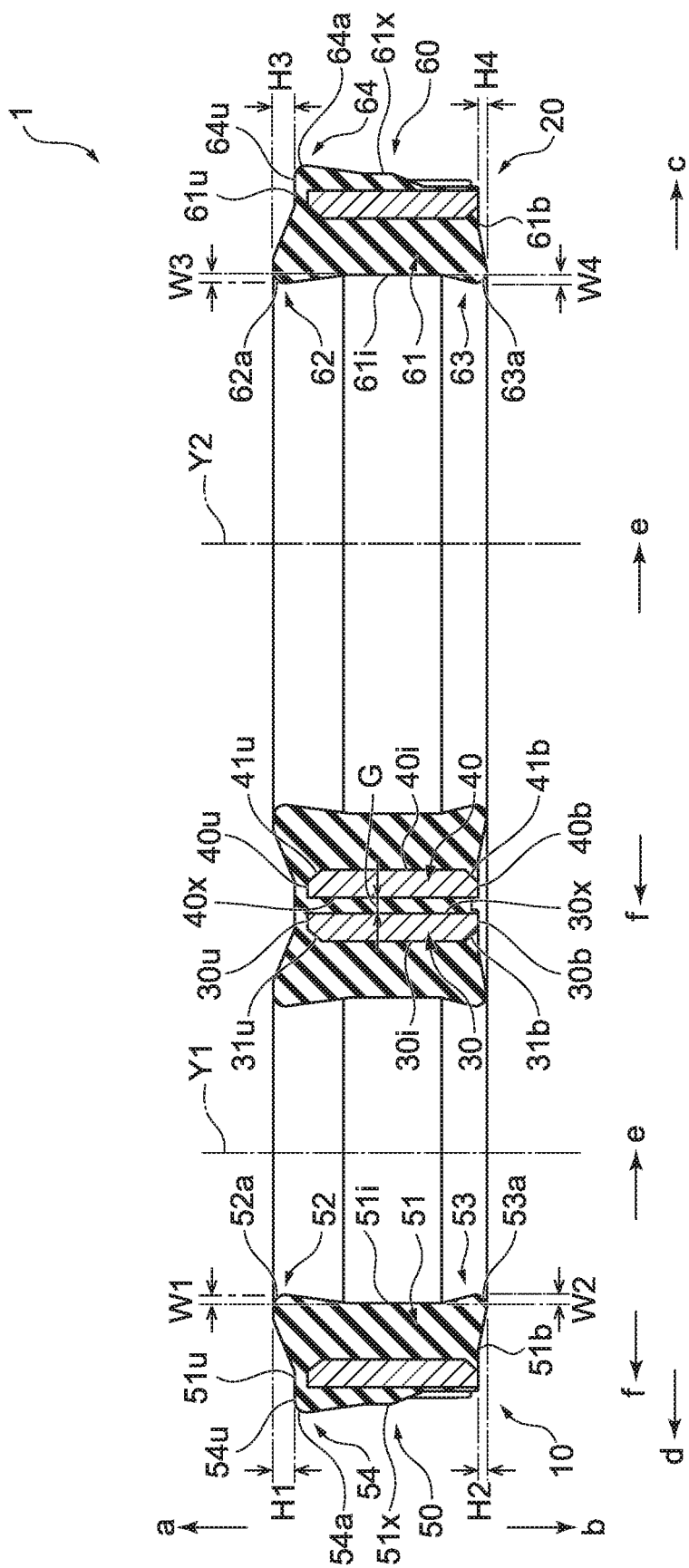

FIG. 1 is a plan view illustrating a schematic configuration of a gasket 1 according to an embodiment of the present disclosure, and FIG. 2 is a cross-sectional view of the gasket 1 according to the embodiment of the present disclosure, taken along line A-A in FIG. 1. Hereinafter, in a direction of axes Y1 and Y2, axes of the gasket 1, in FIGS. 1 and 2 (hereinafter also referred to as an "axis direction"), one side (a direction directed by an arrow a) represents an upper side and another side (a direction directed by an arrow b) represents a lower side, for convenience of explanation. In a width direction of the gasket 1 extending so as to be orthogonal to the axes Y1 and Y2 in FIGS. 1 and 2, one side (a direction directed by an arrow c) represents a right side and another side (a direction directed by an arrow d) represents a left side.

In a radial direction of the gasket 1 extending so as to be orthogonal to each of the axes Y1 and Y2 in FIGS. 1 and 2, one side (a direction directed by an arrow e) represents an inner periphery side and another side (a direction directed by an arrow f) represents an outer periphery side. In the following description, descriptions given of positional relationships and directions between members using up, down, left, or right provide positional relationships and directions merely in the figures and do not provide positional relationships and directions between members installed in actual objects such as vehicles.

The gasket 1 according to the embodiment of the present disclosure serves to seal a gap near a plurality of flow paths of different kinds such as oil passages and air flow paths inside engines of automobiles and other vehicles, passages for automatic transmission fluid (ATF) and continuously variable transmission fluid (CVTF) inside transmissions, and passages for coolant, for example. The range of objects to which the gasket 1 according to the embodiment of the present disclosure is applied is not limited to the examples described above.

The gasket 1 according to the embodiment of the present disclosure has a plurality of gasket members (a left gasket member 10 and a right gasket member 20) including annular reinforcing rings (a left reinforcing ring 30 and a right reinforcing ring 40) formed around the respective axes Y1 and Y2 and annular elastic body parts (a left elastic body part 50 and a right elastic body part 60) that are formed around the respective axes Y1 and Y2 and that are formed from elastic bodies attached to the respective reinforcing rings (the left reinforcing ring 30 and the right reinforcing ring 40). Outer peripheral surfaces 30x and 40x of the plurality of the reinforcing rings (the left reinforcing ring 30 and the right reinforcing ring 40) are close to each other, and the plurality of the elastic body parts (the left elastic body part 50 and the right elastic body part 60) are joined together. Hereinafter, a configuration of the gasket 1 will be described in detail.

In the gasket 1, the elastic bodies of the left elastic body part 50 and the right elastic body part 60 are, for example, a rubber material such as fluororubber or acrylic rubber. The left reinforcing ring 30 and the right reinforcing ring 40 are made of metal and are manufactured by press working or forging, for example. The left elastic body part 50 and the right elastic body part 60 are each molded with a mold by cross-linking (vulcanization).

During the cross-linking, the left reinforcing ring 30 and the right reinforcing ring 40 are each placed in the mold, the left elastic body part 50 and the right elastic body part 60 are bonded to the left reinforcing ring 30 and the right reinforcing ring 40 respectively by cross-linking bonding, and the left elastic body part 50 and the right elastic body part 60 are integrally molded with the left reinforcing ring 30 and the right reinforcing ring 40 respectively.

As illustrated in FIG. 1, an external shape of the gasket 1 is a figure-of-eight shape or a substantially figure-of-eight shape. The gasket 1 has the left gasket member 10, a portion of the gasket 1 on the left side (the arrow d direction), and the right gasket member 20, a portion of the gasket 1 on the right side (the arrow c direction). The left gasket member 10 and the right gasket member 20 are aligned along the width direction (the arrows cd direction) and are joined together.

An external shape of the left gasket member 10 is formed annularly or substantially annularly around the axis Y1. In a middle part of the left gasket member 10, an opening 10a having a cylindrical or substantially cylindrical shape is formed. As illustrated in FIG. 2, the left gasket member 10 includes the left reinforcing ring 30 that is cylindrical or substantially cylindrical in shape around the axis Y1 and the left elastic body part 50 that is formed from the elastic body integrally molded with the left reinforcing ring 30 and that is cylindrical or substantially cylindrical in shape around the axis Y1.

The left reinforcing ring 30 extends parallel to or substantially parallel to the axis Y1. In an upper end portion, an end portion on the upper side (the arrow a direction), of the left reinforcing ring 30, a corner on the inner periphery side (the arrow e direction) has an annular inclined surface 31u. The inclined surface 31u extends diagonally from an upper surface 30u, a surface on the upper side (the arrow a direction) of the left reinforcing ring 30, to an inner peripheral surface 30i, a surface on the inner periphery side (the arrow e direction) of the left reinforcing ring 30.

In a lower end portion, an end portion on the lower side (the arrow b direction), of the left reinforcing ring 30, a corner on the inner periphery side (the arrow e direction) has an annular inclined surface 31b. The inclined surface 31b extends diagonally from a lower surface 30b, a surface on the lower side (the arrow b direction) of the left reinforcing ring 30, to the inner peripheral surface 30i, a surface on the inner periphery side (the arrow e direction) of the left reinforcing ring 30. The upper surface 30u and the lower surface 30b of the left reinforcing ring 30 extend parallel to or substantially parallel to the width direction (the arrows cd direction).

The left elastic body part 50 includes a base 51 in which the left reinforcing ring 30 is buried, an annular upper seal bead 52 that is formed at an upper end portion, an end portion on the upper side (the arrow a direction), of the left elastic body part 50 and that extends to the inner periphery side (the arrow e direction) as progress toward the upper side (the arrow a direction) in the axis direction Y1, and an annular lower seal bead 53 that is formed at a lower end portion, an end portion on the lower side (the arrow b direction), of the left elastic body part 50 and that extends to the inner periphery side (the arrow e direction) as progress toward the lower side (the arrow b direction) in the axis direction Y1. The upper seal bead 52 is higher in stiffness than the lower seal bead 53.

The base 51 extends parallel to or substantially parallel to the axis Y1 and covers the inclined surface 31b, the inner peripheral surface 30i, the inclined surface 31u, and the upper surface 30u of the left reinforcing ring 30, as well as an outer peripheral surface 30x, a surface on the outer periphery side (the arrow f direction) of the left reinforcing ring 30 but does not cover the lower surface 30b of the left reinforcing ring 30. A width of a portion of the base 51 at the inner periphery side (the arrow e direction) is larger than a width of a portion of the base 51 at the outer periphery side (the arrow f direction) beyond the left reinforcing ring 30.

The upper seal bead 52 extends from an upper surface 51u, a surface on the upper side (the arrow a direction) of the base 51, and an inner peripheral surface 51i, a surface on the inner periphery side (the arrow e direction) of the base 51 to the inner periphery side (the arrow e direction) as progress toward the upper side (the arrow a direction) in the axis direction Y1. The lower seal bead 53 extends from a lower surface 51b, a surface on the lower side (the arrow b direction) of the base 51, and the inner peripheral surface 51i of the base 51 to the inner periphery side (the arrow e direction) as progress toward the lower side (the arrow b direction) in the axis direction Y1.

A protrusion amount H1 of the upper seal bead 52 protruding to the upper side (the arrow a direction) is larger than a protrusion amount H2 of the lower seal bead 53 protruding to the lower side (the arrow b direction), and the upper seal bead 52 is higher in stiffness than the lower seal bead 53. A protrusion amount W1 of the upper seal bead 52 protruding to the inner periphery side (the arrow e direction) is equal to or substantially equal to a protrusion amount W2 of the lower seal bead 53 protruding to the inner periphery side (the arrow e direction). A distal end portion 52a of the upper seal bead 52 and a distal end portion 53a of the lower seal bead 53 are rounded.

The left elastic body part 50 includes an annular outer peripheral bead 54 that is formed at the upper end portion of the left elastic body part 50 and that extends from an outer peripheral surface 51x, a surface on the outer periphery side (the arrow f direction) of the base 51, to the outer periphery side (the arrow f direction). An upper surface 54$u$, a surface on the upper side (the arrow a direction) of the outer peripheral bead 54, is flush with the upper surface 51$u$ of the base 51. A distal end portion 54$a$ of the outer peripheral bead 54 is rounded.

As illustrated in FIG. 1, an external shape of the right gasket member 20 is formed annularly or substantially annularly around the axis Y2. In a middle part of the right gasket member 20, an opening 20$a$ having a cylindrical or substantially cylindrical shape is formed. The right gasket member 20 is greater in diameter than the left gasket member 10. The axis Y2 extends parallel to or substantially parallel to the axis Y1. The right gasket member 20 extends parallel to or substantially parallel to the left gasket member 10.

As illustrated in FIG. 2, the right gasket member 20 includes the right reinforcing ring 40 that is cylindrical or substantially cylindrical in shape around the axis Y2 and the right elastic body part 60 that is formed from the elastic body integrally molded with the right reinforcing ring 40 and that is cylindrical or substantially cylindrical in shape around the axis Y2. The right reinforcing ring 40 and the right elastic body part 60 are greater in diameter than the left reinforcing ring 30 and the left elastic body part 50. The right reinforcing ring 40 and the right elastic body part 60 are equal or substantially equal in height in the axial direction (the arrows ab direction) to the left reinforcing ring 30 and the left elastic body part 50 of the left gasket member 10.

The right reinforcing ring 40 extends parallel to or substantially parallel to the axis Y2. In an upper end portion, an end portion on the upper side (the arrow a direction), of the right reinforcing ring 40, a corner on the inner periphery side (the arrow e direction) has an annular inclined surface 41$u$. The inclined surface 41$u$ extends diagonally from an upper surface 40$u$, a surface on the upper side (the arrow a direction) of the right reinforcing ring 40, to an inner peripheral surface 40$i$, a surface on the inner periphery side (the arrow e direction) of the right reinforcing ring 40.

In a lower end portion, an end portion on the lower side (the arrow b direction), of the right reinforcing ring 40, a corner on the inner periphery side (the arrow e direction) has an annular inclined surface 41$b$. The inclined surface 41$b$ extends diagonally from a lower surface 40$b$, a surface on the lower side (the arrow b direction) of the right reinforcing ring 40, to the inner peripheral surface 40$i$, a surface on the inner periphery side (the arrow e direction) of the right reinforcing ring 40. The upper surface 40$u$ and the lower surface 40$b$ of the right reinforcing ring 40 extend parallel to or substantially parallel to the width direction (the arrows cd direction).

The right elastic body part 60 includes a base 61 in which the right reinforcing ring 40 is buried, an annular upper seal bead 62 that is formed at an upper end portion, an end portion on the upper side (the arrow a direction), of the right elastic body part 60 and that extends to the inner periphery side (the arrow e direction) as progress toward the upper side (the arrow a direction) in the axis direction Y2, and an annular lower seal bead 63 that is formed at a lower end portion, an end portion on the lower side (the arrow b direction), of the right elastic body part 60 and that extends to the inner periphery side (the arrow e direction) as progress toward the lower side (the arrow b direction) in the axis direction Y2. The upper seal bead 62 is higher in stiffness than the lower seal bead 63.

The base 61 extends parallel to or substantially parallel to the axis Y2 and covers the inclined surface 41$b$, the inner peripheral surface 40$i$, the inclined surface 41$u$, and the upper surface 40$u$ of the right reinforcing ring 40, as well as an outer peripheral surface 40$x$, a surface on the outer periphery side (the arrow f direction) of the right reinforcing ring 40 but does not cover the lower surface 40$b$ of the right reinforcing ring 40. A width of a portion of the base 61 at the inner periphery side (the arrow e direction) beyond the right reinforcing ring 40 is larger than a width of a portion of the base 61 at the outer periphery side (the arrow f direction) beyond the right reinforcing ring 40. The base 61 is equal or substantially equal in height in the axial direction (the arrows ab direction) and width in the width direction (the arrows cd direction) to the base 51 of the left gasket member 10.

The upper seal bead 62 extends from an upper surface 61$u$, a surface on the upper side (the arrow a direction) of the base 61, and an inner peripheral surface 61$i$, a surface on the inner periphery side (the arrow e direction) of the base 61 to the inner periphery side (the arrow e direction) as progress toward the upper side (the arrow a direction) in the axis direction Y2. The lower seal bead 63 extends from a lower surface 61$b$, a surface on the lower side (the arrow b direction) of the base 61, and the inner peripheral surface 61$i$ of the base 61 to the inner periphery side (the arrow e direction) as progress toward the lower side (the arrow b direction) in the axis direction Y2.

A protrusion amount H3 of the upper seal bead 62 protruding to the upper side (the arrow a direction) is larger than a protrusion amount H4 of the lower seal bead 63 protruding to the lower side (the arrow b direction), and the upper seal bead 62 is higher in stiffness than the lower seal bead 63. A protrusion amount W3 of the upper seal bead 62 protruding to the inner periphery side (the arrow e direction) is equal to or substantially equal to a protrusion amount W4 of the lower seal bead 63 protruding to the inner periphery side (the arrow e direction). A distal end portion 62$a$ of the upper seal bead 62 and a distal end portion 63$a$ of the lower seal bead 63 are rounded.

The upper seal bead 62 is equal or substantially equal in height in the axial direction (the arrows ab direction) and width in the width direction (the arrows cd direction) to the upper seal bead 52 of the left gasket member 10. As a result, the protrusion amount H3 and the protrusion amount W3 of the upper seal bead 62 are equal or substantially equal to the protrusion amount H1 and the protrusion amount W1 of the upper seal bead 52 of the left gasket member 10. The upper seal bead 62 is equal or substantially equal in stiffness to the upper seal bead 52 of the left gasket member 10.

The lower seal bead 63 is equal or substantially equal in height in the axial direction (the arrows ab direction) and width in the width direction (the arrows cd direction) to the lower seal bead 53 of the left gasket member 10. As a result, the protrusion amount H4 and the protrusion amount W4 of the lower seal bead 63 are equal or substantially equal to the protrusion amount H2 and the protrusion amount W2 of the lower seal bead 53 of the left gasket member 10. The lower seal bead 63 is equal or substantially equal in stiffness to the lower seal bead 53 of the left gasket member 10.

The right elastic body part 60 includes an annular outer peripheral bead 64 that is formed at the upper end portion of the right elastic body part 60 and that extends from an outer peripheral surface 61$x$, a surface on the outer periphery side (the arrow f direction) of the base 61, to the outer periphery side (the arrow f direction). An upper surface 64$u$, a surface on the upper side (the arrow a direction) of the outer peripheral bead 64, is flush with the upper surface 61u of the base 61. A distal end portion 64a of the outer peripheral bead 64 is rounded.

The outer peripheral bead 64 is equal or substantially equal in height in the axial direction (the arrows ab direction) and width in the width direction (the arrows cd direction) to the outer peripheral bead 54 of the left gasket member 10. As a result, a protrusion amount of the outer peripheral bead 64 protruding to the outer periphery side (the arrow f direction) is equal or substantially equal to a protrusion amount of the outer peripheral bead 54 of the left gasket member 10 protruding to the outer periphery side (the arrow f direction). The outer peripheral bead 64 is equal or substantially equal in stiffness to the outer peripheral bead 54 of the left gasket member 10.

In the gasket 1, the outer peripheral surfaces 30x and 40x of the left reinforcing ring 30 and the right reinforcing ring 40 are close to each other, and the left elastic body part 50 and the right elastic body part 60 are joined together. Specifically, the outer peripheral surface 30x on the right side (the arrow c direction) of the left reinforcing ring 30 is close to the outer peripheral surface 40x on the left side (the arrow d direction) of the right reinforcing ring 40, with a predetermined space G left in the width direction (the arrows cd direction). The predetermined space G is about 0.5 mm. Preferably, the predetermined space G should range from 0.3 mm to 0.7 mm. The left elastic body part 50 and the right elastic body part 60 are molded and integrated with each other between the predetermined space G. The predetermined space G is filled with the elastic bodies of the left elastic body part 50 and the right elastic body part 60. Thus, the left elastic body part 50 and the right elastic body part 60 are joined together in the width direction (the arrows cd direction).

Figure 3:
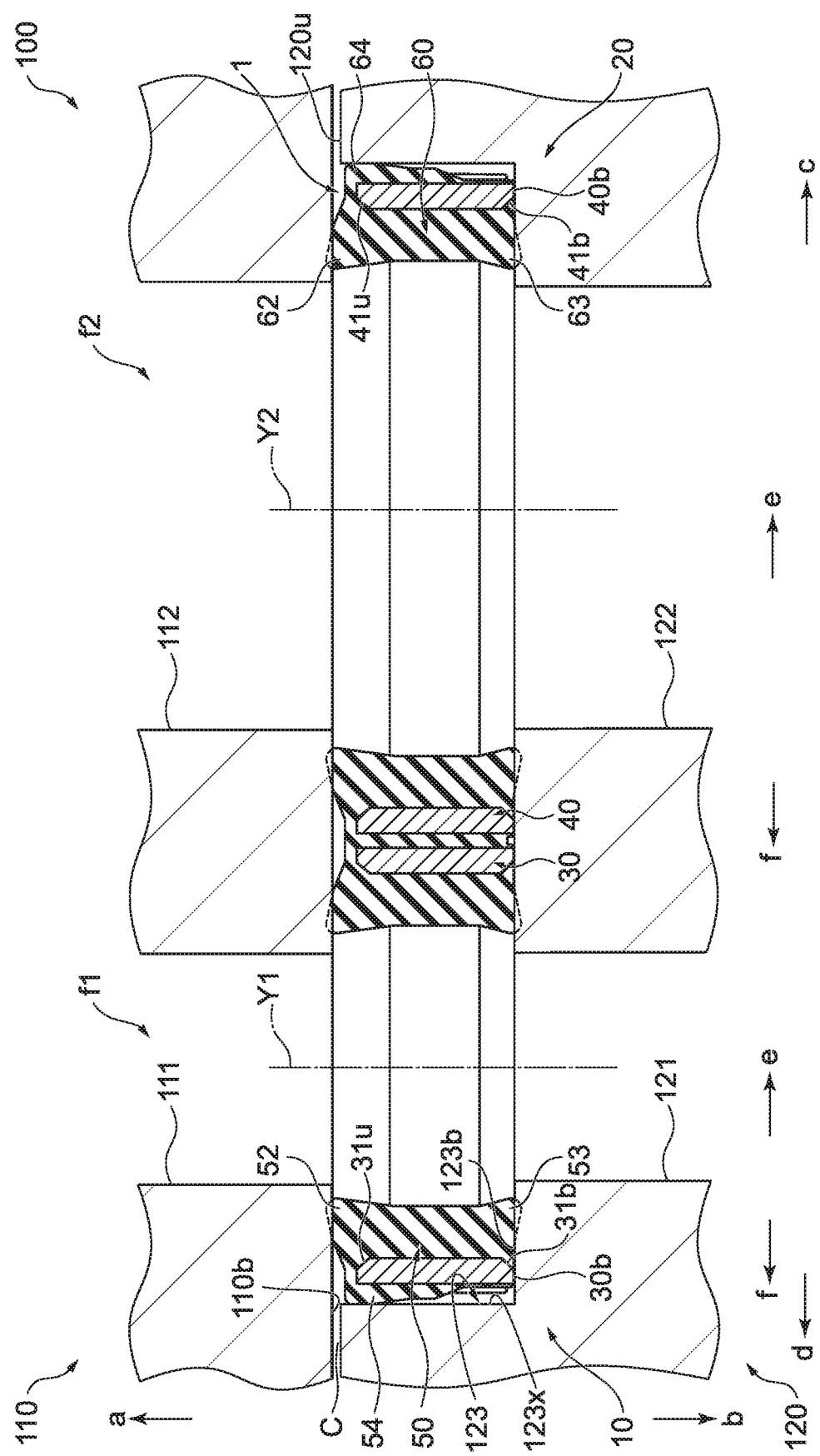
FIG. 3 A cross-sectional view illustrating a gasket according to an embodiment of the present disclosure in a state of being installed between an upper member and a lower member of a sealed object

Next, an installation state in which the gasket 1 is installed in an object will be described. FIG. 3 is a cross-sectional view illustrating the gasket 1 according to the embodiment of the present disclosure in a state of being installed between an upper member 110 and a lower member 120 of a sealed object 100. The sealed object 100 includes the upper member 110, which is an upper-side (arrow a direction side) member of the sealed object 100, and the lower member 120, which is a lower-side (arrow b direction side) member of the sealed object 100.

The upper member 110 is disposed on the upper side (the arrow a direction) of the gasket 1 and has a left through-hole 111 that is a through-hole on the left side (the arrow d direction) and a right through-hole 112 that is a through-hole on the right side (the arrow c direction) and that is formed side by side with the left through-hole 111 in the width direction (the arrows cd direction). A diameter of the right through-hole 112 is greater than a diameter of the left through-hole 111. The lower member 120 is disposed on the lower side (the arrow b direction) of the gasket 1 and has a left through-hole 121 that is a through-hole on the left side (the arrow d direction) and a right through-hole 122 that is a through-hole on the right side (the arrow c direction) and that is formed side by side with the left through-hole 121 in the width direction (the arrows cd direction). A diameter of the right through-hole 122 is greater than a diameter of the left through-hole 121.

The diameter of the left through-hole 121 in the lower member 120 is equal to or substantially equal to the diameter of the left through-hole 111 in the upper member 110. The left through-hole 121 in the lower member 120 and the left through-hole 111 in the upper member 110 are coaxial or substantially coaxial holes with respect to the axis Y1 and form a left flow path f1 that is a flow path on the left side (the arrow d direction).

The diameter of the right through-hole 122 in the lower member 120 is equal to or substantially equal to the diameter of the right through-hole 112 in the upper member 110. The right through-hole 122 in the lower member 120 and the right through-hole 112 in the upper member 110 are coaxial or substantially coaxial holes with respect to the axis Y2 and form a right flow path f2 that is a flow path on the right side (the arrow c direction). The left flow path f1 and the right flow path f2 are close to each other in the width direction (the arrows cd direction), and a space between the left flow path f1 and the right flow path f2 is narrow.

The lower member 120 has an accommodating part 123 to accommodate the gasket 1. The accommodating part 123 is recessed downward (the arrow b direction) from an upper surface 120u, a surface on the upper side (the arrow a direction) of the lower member 120.

As illustrated in FIG. 3, when the gasket 1 is accommodated in the accommodating part 123 of the lower member 120, the upper member 110 is disposed on the upper side (the arrow a direction) of the gasket 1, and the lower member 120 and the upper member 110 are fastened with bolts or other fasteners (not illustrated), the gasket 1 is pressed by the upper member 110 and a compressive force is applied to the upper seal beads 52, 62 and the lower seal beads 53, 63 in the axial direction (the arrows ab direction).

Whereas the upper seal beads 52, 62 are thick and have high stiffness, the lower seal beads 53, 63 are thin, have low stiffness, and readily deform. Thus, the lower seal beads 53, 63 deform and stretch to the inner periphery side (the arrow e direction). Since the distal end portions 53a, 63a are rounded, the lower seal beads 53, 63 readily stretch to the inner periphery side (the arrow e direction).

After that, when the lower surface 30b of the left reinforcing ring 30 and the lower surface 40b of the right reinforcing ring 40 are in contact with or close to a lower surface 123b that is a surface on the lower side (the arrow b direction) of the accommodating part 123 of the lower member 120, the lower seal beads 53, 63 stop stretching to the inner periphery side (the arrow e direction) and the upper seal beads 52, 62 deform and stretch to the inner periphery side (the arrow e direction).

After that, when the lower member 120 and the upper member 110 are completely fastened with bolts or other fasteners (not illustrated), the upper seal beads 52, 62 are in close contact with a lower surface 110b that is a surface on the lower side (the arrow b direction) of the upper member 110 and the lower seal beads 53, 63 are in close contact with the lower surface 123b of the accommodating part 123 of the lower member 120. The gasket thereby seals a gap C between the upper member 110 and the lower member 120 of the sealed object 100. The outer peripheral beads 54, 64 are in close contact with an outer peripheral surface 123x that is a surface on the outer periphery side (the arrow f direction) of the accommodating part 123 of the lower member 120 while being compressed in the width direction (the arrows cd direction).

In this way, in the gasket 1 according to the embodiment of the present disclosure, the outer peripheral surfaces 30x and 40x of the left reinforcing ring 30 and the right reinforcing ring 40 are close to each other, and the left elastic body part 50 and the right elastic body part 60 are joined together. In other words, the gasket 1 is concentrated in shape. This enables the outer peripheral surfaces 30x and 40x of the left reinforcing ring 30 and the right reinforcing ring 40 to act as an external wall and allow an external wall of the lower member 120 to be partly omitted. Thus, even if the left flow path f1 and the right flow path f2 are close to each other in the width direction (the arrows cd direction) and the space between the left flow path f1 and the right flow path f2 is narrow, the gasket can be installed between the upper member 110 and the lower member 120 of the sealed object 100.

Since the stiffness of the upper seal beads 52, 62 is higher than the stiffness of the lower seal beads 53, 63, the elasticity of the gasket 1 is unevenly distributed to the lower side (the arrow b direction), i.e., a lower stiffness side. This, even if the gasket 1 receives high fluid pressure from a fluid flowing through the left flow path f1 and the right flow path f2, prevents the left gasket member 10 and the right gasket member 20 of the gasket 1 from being shifted in different directions and prevents leakage of the fluid.

The left elastic body part 50 and the right elastic body part 60 include the respective annular outer peripheral beads 54 and 64, which extend from the outer peripheral surfaces 51x and 61x of the bases 51 and 61 to the outer periphery side (the arrow f direction). This inhibits the gasket 1 from being displaced in the width direction (the arrows cd direction) even if the gasket 1 receives high fluid pressure from the fluid flowing through the left flow path f1 and the right flow path f2.

In the upper end portions of the left reinforcing ring 30 and the right reinforcing ring 40, the corners on the inner periphery side (the arrow e direction) have the respective annular inclined surfaces 31u and 41u. In the lower end portions of the left reinforcing ring 30 and the right reinforcing ring 40, the corners on the inner periphery side (the arrow e direction) have the respective annular inclined surfaces 31b and 41b. This prevents stress from being concentrated on the corners on the inner periphery side (the arrow e direction) in the upper and the lower end portions of the left reinforcing ring 30 and the right reinforcing ring 40 and thus prevents the left elastic body part 50 and the right elastic body part 60 from coming off or cracking even if the gasket 1 receives high fluid pressure from the fluid flowing through the left flow path f1 and the right flow path f2.

Although the preferred embodiments of the present disclosure have been described above, the present disclosure is not limited to the embodiments, and includes any modes falling within the scope of the concept and claims of the present disclosure. Respective configurations may be appropriately selectively combined to solve at least part of the above-described problems and achieve at least part of the above-described effects. For example, in the above-described embodiments, the shape, material, arrangement, size and the like of each component can be appropriately changed according to a specific use mode of the present disclosure.

An embodiment of the present disclosure has been described by taking an instance in which two gasket members, i.e., the left gasket member 10 and the right gasket member 20, are aligned along the width direction (the arrows cd direction) and are joined together in the gasket 1 according to the embodiment of the present disclosure. However, the present disclosure is not limited to this instance. Three or more gasket members may be joined together with proviso that the plurality of the gasket members include a plurality of respective reinforcing rings whose outer peripheral surfaces are close to each other and a plurality of respective elastic body parts that are joined together.

An embodiment of the present disclosure has been described by taking an instance in which the external shape of the gasket 1 according to the embodiment of the present disclosure is a figure-of-eight shape or a substantially figure-of-eight shape and the external shapes of the left gasket member 10 and the right gasket member 20 are formed annularly or substantially annularly. However, the present disclosure is not limited to this instance. The left gasket member 10 and the right gasket member 20 may have various other shapes, and the gasket 1 may have any of various shapes in which the left gasket member 10 and the right gasket member 20 are joined together.

The invention claimed is:

1. A gasket, comprising:
a plurality of gasket members each including an annular reinforcing ring formed around an axis and an annular elastic body part that is formed around the axis and that is formed from an elastic body attached to the reinforcing ring,
wherein axially extending outer peripheral surfaces of a plurality of the reinforcing rings are close to each other, the axially extending outer peripheral surfaces being completely covered by an elastic material of a plurality of the elastic body parts, and the elastic material of the plurality of the elastic body parts join the plurality of the elastic body parts together,
wherein the axis of each of the plurality of the reinforcing rings extend parallel to each other at a spaced apart distance, and
wherein, in a region where the plurality of the elastic body parts are joined together, the elastic material has an interconnecting elastic material portion that 5 directly joins the axially extending outer peripheral surfaces of adjacent annular reinforcing rings of the plurality of reinforcing rings to each other.

2. The gasket according to claim 1, wherein each of the elastic body parts comprises:
one annular seal bead formed at one end portion that is an end portion on one side of each of the elastic body parts, the one seal bead extending to an inner periphery side as progressing toward the one side in a direction of the axis; and
another annular seal bead formed at another end portion that is an end portion on another side of each of the elastic body parts, the other seal bead extending to the inner periphery side as progress toward the other side in the direction of the axis,
wherein the one seal bead is higher in stiffness than the other seal bead.

3. The gasket according to claim 1, wherein each of the elastic body parts comprises an annular outer peripheral bead formed at one end portion of each of the elastic body parts, the outer peripheral bead extending from an outer peripheral surface of each of the elastic body parts to an outer periphery side.

* * * * *